(12) United States Patent
Hou et al.

(10) Patent No.: US 8,867,420 B2
(45) Date of Patent: Oct. 21, 2014

(54) METHOD AND APPARATUS FOR ENHANCING HIGH DATA RATE UPLINK OPERATIONS

(75) Inventors: Jilei Hou, San Diego, CA (US); Shengshan Cui, San Diego, CA (US); Danlu Zhang, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 13/046,220

(22) Filed: Mar. 11, 2011

(65) Prior Publication Data

US 2011/0222455 A1    Sep. 15, 2011

Related U.S. Application Data

(60) Provisional application No. 61/314,080, filed on Mar. 15, 2010.

(51) Int. Cl.
*G08C 17/00* (2006.01)
*H04W 52/26* (2009.01)
*H04W 52/32* (2009.01)
*H04W 52/24* (2009.01)
*H04W 52/08* (2009.01)
*H04W 52/14* (2009.01)

(52) U.S. Cl.
CPC .......... *H04W 52/267* (2013.01); *H04W 52/325* (2013.01); *H04W 52/08* (2013.01); *H04W 52/146* (2013.01); *H04W 52/24* (2013.01)
USPC ........................................................ 370/311

(58) Field of Classification Search
CPC . H04W 52/00; H04W 52/02; H04W 52/0206; H04W 52/0209; H04W 52/0212; H04W 52/04; H04W 52/24; H04W 52/18; H04W 52/241; H04W 52/243

USPC .............. 370/310, 328, 331, 229, 310.2, 329, 370/311
See application file for complete search history.

(56) References Cited

U.S. PATENT DOCUMENTS 6,085,108 A * 7/2000 Knutsson et al. ............. 455/522
6,747,960 B2 * 6/2004 Tillotson ....................... 370/318
(Continued)

FOREIGN PATENT DOCUMENTS

JP    2002026747 A    1/2002
JP    2004088333 A    3/2004
(Continued)

OTHER PUBLICATIONS

Ashwin Sridharan, et al., Distributed uplink scheduling in CDMA networks; Networking 2007, LNCS4479, International Federation for Information Processing, p. 500-510.
(Continued)

*Primary Examiner* — Anh Ngoc Nguyen
(74) *Attorney, Agent, or Firm* — Darren M. Simon

(57) ABSTRACT

A method and apparatus for enhancing uplink operations in a CDMA system is provided. The method may include receiving a rate control value and a transmit power value from a node B, wherein the rate control value is determined through uplink scheduling by the node B, and wherein the transmit power value is selected by the node B to maintain a signal to interference plus noise (SINR) metric within a threshold for a pilot channel, transmitting control channel information at a first power level determined from the transmit power value, and using a first average power tracking unit to generate the first selected transmit power and transmitting data channel information at a second power level determined from both the rate control value and the transmit power value.

22 Claims, 10 Drawing Sheets

(56) References Cited

U.S. PATENT DOCUMENTS

| | | |
|---|---|---|
| 7,110,786 B2 | 9/2006 | Moulsley et al. |
| 7,120,134 B2 | 10/2006 | Tiedemann, Jr. et al. |
| 7,215,653 B2 | 5/2007 | Kim et al. |
| 7,630,731 B2 | 12/2009 | Lundby et al. |
| 8,009,607 B2 * | 8/2011 | Gunnarsson et al. ......... 370/320 |
| 2003/0108013 A1 * | 6/2003 | Hwang et al. ................ 370/335 |
| 2004/0193971 A1 * | 9/2004 | Soong et al. ................. 714/704 |
| 2004/0246924 A1 * | 12/2004 | Lundby et al. ............... 370/332 |
| 2005/0201280 A1 * | 9/2005 | Lundby et al. ............... 370/229 |
| 2008/0188260 A1 | 8/2008 | Xiao et al. |
| 2009/0103479 A1 | 4/2009 | Goto et al. |
| 2010/0150069 A1 * | 6/2010 | Fang et al. ................... 370/328 |

FOREIGN PATENT DOCUMENTS

| | | |
|---|---|---|
| JP | 2005033430 A | 2/2005 |
| JP | 2007527649 A | 9/2007 |
| JP | 2009105570 A | 5/2009 |
| JP | 2011509592 A | 3/2011 |
| WO | 2005011145 | 2/2005 |
| WO | WO2008076065 A2 | 6/2008 |

OTHER PUBLICATIONS

International Search Report and Written Opinion—PCT/US2011/028554, ISA/EPO—Jul. 7, 2011.

* cited by examiner

METHOD AND APPARATUS FOR ENHANCING HIGH DATA RATE UPLINK OPERATIONS

CROSS-REFERENCE TO RELATED APPLICATION(S)

This application claims the benefit of U.S. Provisional Patent Application No. 61/314,080, titled "APPARATUS AND METHOD FOR ENHANCING HIGH DATA RATE UPLINK OPERATIONS," filed on Mar. 15, 2010, which is expressly incorporated by reference herein in their entirety.

BACKGROUND

1. Field

Aspects of the present disclosure relate generally to wireless communication systems, and more particularly, to enabling enhanced uplink operations in a CDMA system.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, orthogonal frequency division multiple access (OFDMA) systems, and high speed packet access (HSPA) systems.

Generally, a wireless multiple-access communication system can simultaneously support communication for multiple wireless terminals. Each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system digital rotator A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Further, in a CDMA system, high data rates may be offered on both downlink and uplink. For example, high speed uplink packet access (HSUPA) was introduced in WCDMA Release 6 with the initial peak is 5.7 Mbps, based on QPSK modulation. The peak rate is increased in Release 7 to 11.4 Mbps with 16QAM modulation. For such high data rates, the receive signal-to-noise-plus-interference ratio (SINR) may be so high that the interference between multiple paths may no longer negligible. Certain operations, including power control, may be enhanced for optimal performance in this new operation region.

Thus, improved apparatus and methods for enhancing high data rate uplink operations in a cellular wireless communication system are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in providing for enhancing high data rate uplink operations. According to one aspect, a method for enhancing high data rate uplink operations is provided. The method can include receiving a rate control value and a transmit power value from a node B, wherein the rate control value is determined through uplink scheduling by the node B, and wherein the transmit power value is selected by the node B to maintain a signal to interference plus noise (SINR) metric within a threshold for a pilot channel. Further, the method can include transmitting control channel information at a first power level determined from the transmit power value. Moreover, the method can include transmitting data channel information at a second power level determined from both the rate control value and power control value.

Another aspect relates to a computer program product comprising a computer-readable medium. The computer-readable medium including code executable to receive a rate control value and a transmit power value from a node B, wherein the rate control value is determined through uplink scheduling by the node B, and wherein the transmit power value is selected by the node B to maintain a SINR metric within a threshold for a pilot channel. Further, the computer-readable medium includes code executable to transmit control channel information at a first power level determined from the transmit power value. Moreover, the computer-readable medium includes code executable to transmit data channel information at a second power level determined from both the rate control value and power control value.

Yet another aspect relates to an apparatus. The apparatus can comprise means for receiving a rate control value and a transmit power value from a node B, wherein the rate control value is determined through uplink scheduling by the node B, and wherein the transmit power value is selected by the node B to maintain a SINR metric within a threshold for a pilot channel. Further, the apparatus can comprise means for transmitting control channel information at a first power level determined from the transmit power value. Moreover, the apparatus can comprise means for transmitting data channel information at a second power level determined from both the rate control value and power control value.

Another aspect relates to an apparatus. The apparatus can include a processor, configured for receiving a rate control value and a transmit power value from a node B, wherein the rate control value is determined through uplink scheduling by the node B, and wherein the transmit power value is selected by the node B to maintain a SINR metric within a threshold for a pilot channel, transmitting control channel information at a first power level determined from the transmit power value, and transmitting data channel information at a second power level determined from both the rate control value and power control value. Further, the apparatus can include a memory coupled to the processor for storing data.

Still another aspect relates to an apparatus. The apparatus can include a receiver enabled for receiving a rate control value and a transmit power value from a node B, wherein the rate control value is determined through uplink scheduling by the node B, and wherein the transmit power value is selected by the node B to maintain a SINR metric within a threshold for a pilot channel. Moreover, the apparatus can include a transmitter enabled for: transmitting control channel information at a first power level determined from the transmit power value, and transmitting data channel information at a second power level determined from both the rate control value and power control value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
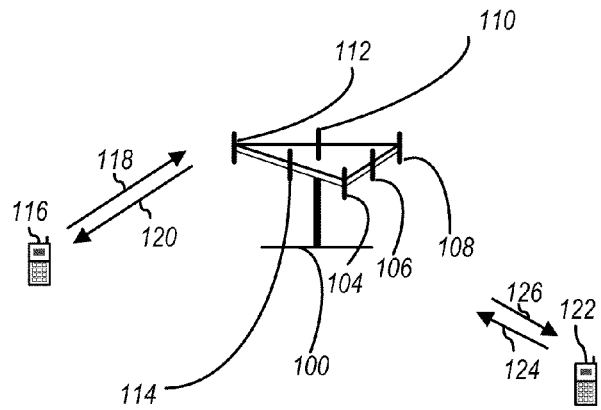
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
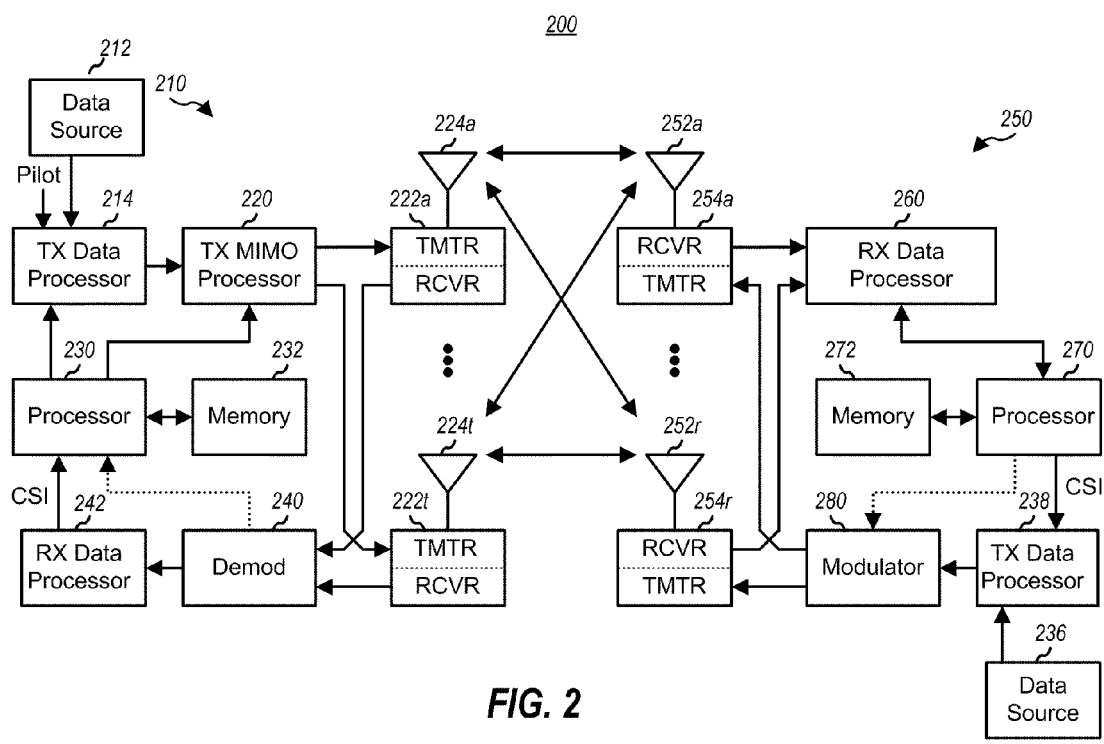
FIG. 2 illustrates a block diagram of a communication system.

FIG. 2 is a block diagram of an embodiment of a transmitter system 210 (also known as the access point) and a receiver system 250 (also known as access terminal) in a MIMO system 200. In one aspect, system 200 may be used to implement one or more mobile transmit diversity schemes. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)

Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
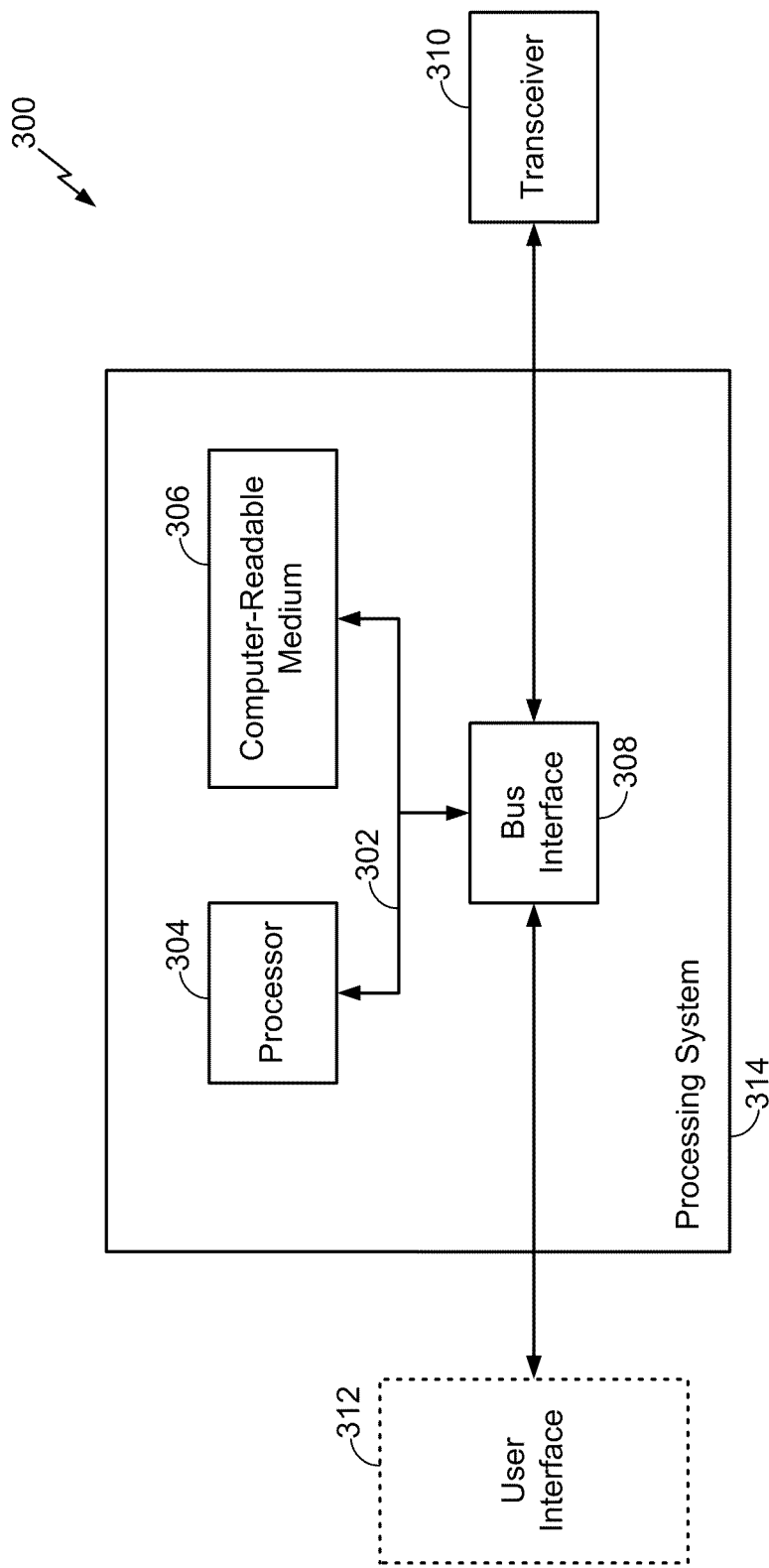
FIG. 3 is a diagram illustrating an example of a hardware implementation for an apparatus employing a processing system.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 3 is a conceptual diagram illustrating an example of a hardware implementation for an apparatus 300 employing a processing system 314. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

Further, processor 304 can provide means for receiving a rate control value and a transmit power value from a node B, wherein the rate control value is determined through uplink scheduling by the node B, and wherein the transmit power value is selected by the node B to maintain a SINR metric within a threshold, means for transmitting control channel information at a first power level determined from the transmit power value, and means for transmitting data channel information at a second power level determined from both the rate control value and the transmit power value. In one aspect, processor 304 may further provide means for receiving an increase transmit power command from the node B, and means for transmitting the control channel information at a third power level, wherein the third power level is greater than the first power level by an amount provided in the increase transmit power command. In another aspect, processor 304 may further provide means for receiving a decrease transmit power command from the node B, means for transmitting the control channel information at a fourth power level, wherein the fourth power level is less than the first power level by an amount provided in the decrease transmit power command, and means for transmitting the data channel information at a fifth power level, wherein the fifth power level is less than the second power level by an amount provided in the decrease transmit power command. In another aspect, processor 304 may further provide means for receiving a packet failure response from the node B, and means for transmitting the data channel information at a sixth power level, wherein the sixth power level is greater than the second power level by an amount provided by a margin value, where the margin value is included in the second rate control value. In another aspect, processor 304 may further provide means for receiving a packet success response from the node B, and means for transmitting the data channel information at a seventh power level, wherein the seventh power level is less than the second power level by an amount provided by the margin value.

Figure 4:
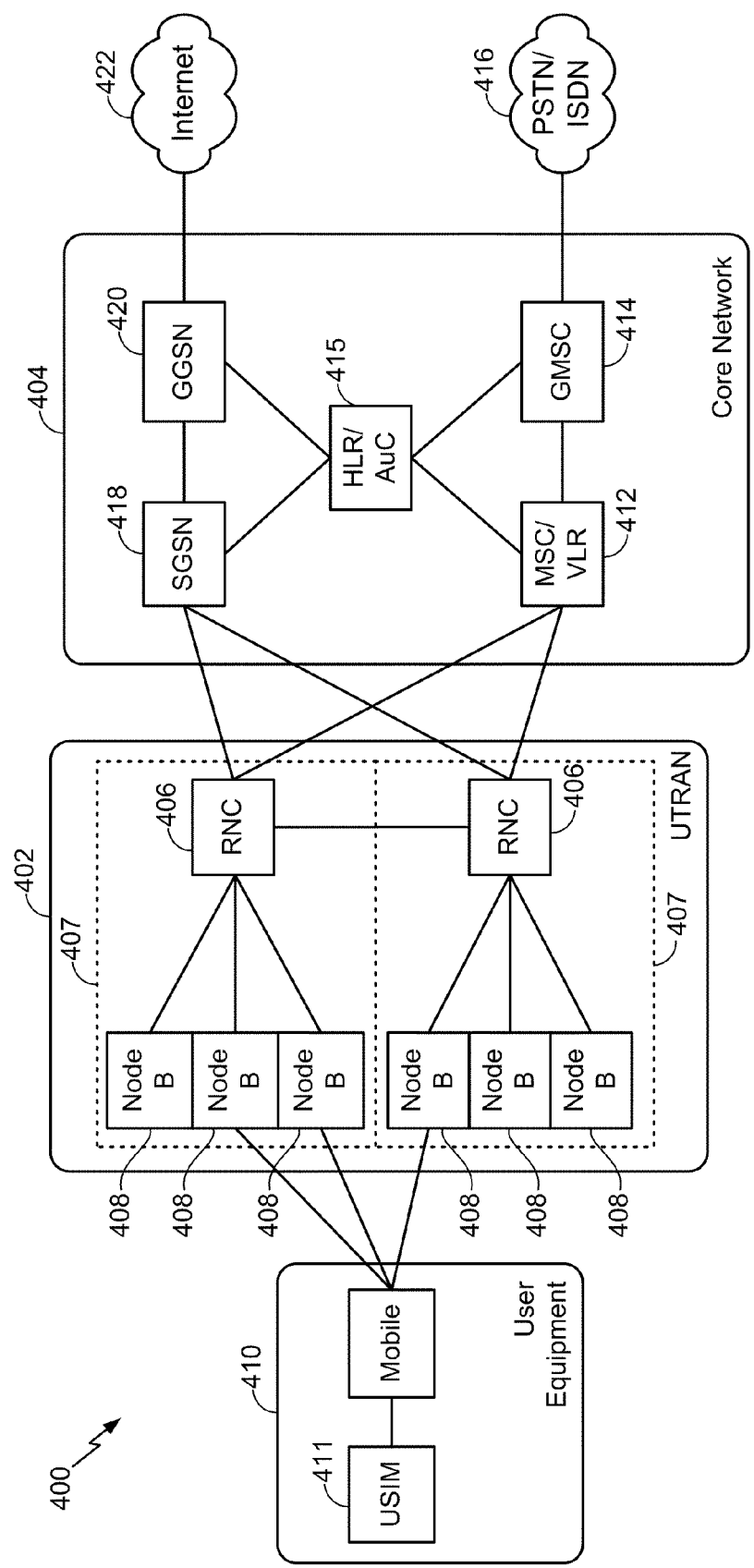
FIG. 4 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 400 employing a W-CDMA air interface. A UMTS network includes three interacting domains: a Core Network (CN) 404, a UMTS Terrestrial Radio Access Network (UTRAN) 402, and User Equipment (UE) 410. In this example, the UTRAN 402 provides various wireless services including telephony, video, data, messaging, broadcasts, and/or other services. The UTRAN 402 may include a plurality of Radio Network Subsystems (RNSs) such as RNS 407, each including a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. Moreover, certain applications may utilize femtocells served by a home Node B (HNB), home enhanced Node B (HeNB), femto access point (FAP), access point base station, etc. For clarity, in the illustrated example, three Node Bs 408 are shown in each RNS 407; however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The downlink (DL), also called the forward link, refers to the communication link from a Node B 408 to a UE 410, and the uplink (UL), also called the reverse link, refers to the communication link from a UE 410 to a Node B 408.

The CN domain 404 interfaces with one or more access networks, such as the UTRAN 402. As shown, the core network 404 is a GSM core network. However, as those skilled in the art will recognize, the various concepts presented throughout this disclosure may be implemented in a RAN, or other suitable access network, to provide UEs with access to types of core networks other than GSM networks.

The core network 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a visitor location register (VLR) that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The core network 404 also supports packet-data services with a serving GPRS support node (SGSN) 418 and a GGSN 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 408 and a UE 410. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Generally, uplink power control may be used in CDMA systems. Power control may be used to adjust the mobile transmit power so that the received power is maintained at a desired level. Further, power control may be used to solve the 'near-far' problem in which a user at the cell edge may be overwhelmed by a nearby user if the mobile transmit powers are not properly regulated. Mobile transmit power adjustment may be based on feedback of one bit per adjustment period from a base station (e.g. node B), commanding the mobile (e.g. UE) to adjust its power 'up' or 'down' by a proportion called the power control step size. When a dedicated pilot is introduced on the uplink, the power control may adjust the transmit pilot power according to the same mechanism. Further, transmit powers of other channels may be set at certain offsets from the pilot power. Additionally, the offset of the data traffic channel to the pilot, defined as "Traffic to Pilot Ratio", or T2P, may dependent on the data rate and may controlled by the data rate control. In HSUPA nomenclature, pilot is part of DPCCH (Dedicated Physical Control Channel) and the data is carried in the E-DPDCH (Enhanced-Dedicated Physical Data Channel). These terms will be used interchangeably in the sequel.

When uplink data rates are low, the SINR at the base station may also low. As such, multi-path interference may be negligible because the total received power of each user is only a tiny part of the total received power. Further, when the mobile transmit power is adjusted, neglecting the channel variation, the base station received power changes by the same proportion. In a low SINR region, the receiver SINR is proportional to the total received power. Therefore, the increase and decrease in the SINR is also by the same proportion. Power control thus may be effectively control the SINR by adjusting the transmit power.

However, efficiency may be compromised when the received SINR is high. Here when the received power increases or decreases, the interference between the paths may also increase or decrease. In the limit, when the transmit power, and thus received power of each path becomes infinite, the total received SINR, after maximum ratio combining or equalizer, may remain a constant regardless of the transmit power variation. As such, power control may lose its capability in controlling the SINR. A UE's self-interference may also impact dynamic response in the transmit power to a fading channel. For instance, when the channel fades down, the power increases more rapidly than the channel, largely due to the increased self-interference. This increase may lead to excess power usage which the UE may take a long time to decrease when the channel fades down.

In addition, when the received SINR of any mobile is high, an increase in its received power may cause all other mobiles to increase their powers, creating more interference. This can be viewed as another form of interference. Further, the above described example of the interference between multiple paths can also be applied to the case of interference between users.

In the presence of significant self-interference, a power control scheme may be enhanced to retain its efficiency. In one aspect, a power control scheme may decouple the power of traffic and pilot (e.g. control) channels. With high data rates, the traffic channel may be sent at T2P and thus power of the traffic channel may be the dominant component in the total power. Further, T2P may be adjusted by the data rate control periodically. In such an aspect, within each rate control period, when the mobile gets a power 'up' command, if the power for the data channel power does not increase, the self-interference will not increase significantly and therefore the received pilot SINR may almost linearly increases with transmit pilot power, thereby avoiding excess power during down-fading. Further, when the mobile receives a 'down' command, power of all the channels (e.g. data and control) may decrease.

Figure 5:
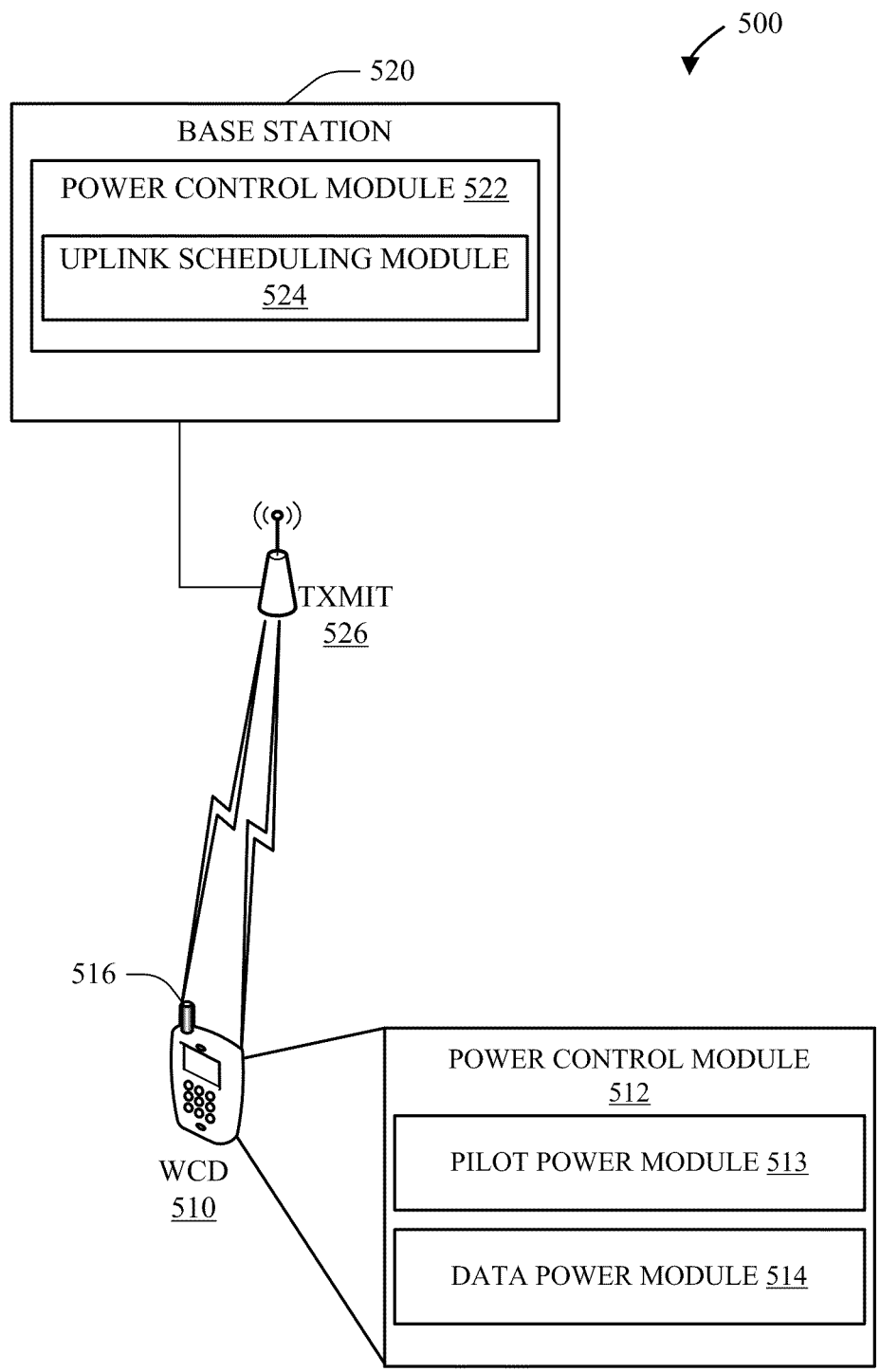
FIG. 5 is a block diagram of a system for structuring and conducting communications in a wireless communication system according to an aspect.

With reference now to FIG. 5, a block diagram of a wireless communication system 500 for enabling uplink transmit diversity using one or more beamforming is illustrated. System 500 may include one or more base stations 520 and one or more wireless communications device (e.g. terminals, UEs) 510, which can communicate via respective antennas 526 and 516. In one aspect, base station 520 may function as an E-NodeB.

Further, base station 520 may include power control module 522 which may be operable to enhance uplink operations. Power control module 522 may further include uplink scheduling module 524 which may be operable to transmit scheduling grants. In one aspect, in a HSUPA system, an uplink transmission is packet switched and is generally scheduled. Transmission time may be divided into 0.667 ms slots, which may be grouped into Transmission-Time-Interval (TTI) with interlaces to facilitate Hybrid ARQ operation. To request data transmissions, users may send Scheduling Information (SI) messages containing information, such as queue lengths and power headroom, which can be translated into the maximum supportable data rates. Uplink scheduling module 524 may send scheduling grants to the users through physical channels. Using said scheduling grants the uplink serving node B may change the user data rates rapidly while the non-serving cells in a user's active set can send commands to hold or bring down the user data rate gradually. Further, Power control module 522 may determine an appropriate scheduling rate using a Rake receiver, an equalizer, etc. In one aspect, Rake architecture may be used for the initial offering of high data rates in HSUPA although an equalizer can provide greater spectrum efficiency with higher complexity.

In one aspect, uplink scheduling module 524 may determine an appropriate data rate. For example, one may denote the transmit power as p, channel gain as g, the total interference from thermal noise and other users as $N_{total}$. Here g may be obtained after Rake combining or through an equalizer. For example, assuming two equally strong paths, each with received power $E_c$, with thermal noise denoted as $N_0$, the combined $$\frac{E_c}{N_0},$$

after Rake combining is $$\left(\frac{E_c}{N_0}\right) = \frac{2E_c}{E_c + N_0}.$$

At low SINR limit, $$E_c \ll N_0, \left(\frac{E_c}{N_0}\right)_{total} \approx \frac{2E_c}{N_0}.$$

Where a change in $E_c$ may result in a change of the combined $$\frac{E_c}{N_0}$$

with the same proportion. However, when $E_c$ and $N_0$ are comparable, in the limit where $$E_c \gg N_0, \left(\frac{E_c}{N_0}\right)_{total} \approx \frac{2E_c}{E_c} = 3 \text{ dB},$$

an increasing $E_c$ will not increase the combined $$\frac{E_c}{N_0}.$$

Furthermore, when channel quality varies in a fading environment, such self-interference may cause rapid excessive power increase when the power fades down. It could take a long time for such excessive power to decrease to the normal level when the channel fades up.

Further, assume that, given g and $N_{total}$, the achievable data rate is given by $R(\gamma)$ where $$\gamma = \frac{pg}{N_{total}}$$

denotes the SINR. Furthermore, we assume that $R(\gamma)$ may be a monotonically increasing and concave function of $\gamma$. Suppose that the instantaneous channel gain g is known to the base station 520. In HSUPA, g can be inferred by the base station 520 from the reported mobile headroom information. The rate control chooses p given the channel gain g. As such, one can maximize the average data rate under the average power constraint using equation (1):

$$\text{maximize} \int_0^\infty R\left(\frac{p(g)g}{N_{total}}\right) f(g) dg \qquad (1)$$

$$\text{subject to} \int_0^\infty p(g) f(g) dg = P_{avg}, \text{ where } p(g) \geq 0$$

In equation (1), the maximum transmit power limitation may be ignored since the power of most HSUPA mobiles is limited by the scheduling grants, especially when the cell size is small. As such, the power/rate adaptation, which maximizes (1) is presented in equation (2):

$$p(g) = \begin{cases} \frac{N_{total}}{g}(R')^{-1}\left(\frac{N_{total}}{g}v^*\right), & g \geq v^* \frac{N_{total}}{R'(0)} \\ 0, & \text{otherwise} \end{cases} \qquad (2)$$

where $(R')^{-1}(\bullet)$ is the inverse function of $R'$. Further, the derivative of R with respect to $\gamma$, and $v^*$ can be computed through the constraint of equation (3):

$$\int_{v^*\frac{N_{total}}{R'(0)}}^\infty \frac{N_{total}}{g}(R')^{-1}\left(\frac{N_{total}}{g}v^*\right) f(g) dg = P_{avg} \qquad (3)$$

The optimal solution has the water-filling structure. The optimal solution has the following property: the received SINR, $$\gamma = \frac{pg}{N_{total}}$$

decreases when g decreases, as seen by the concavity of $R(\gamma)$: when g decreases, $$\frac{v^* N_{total}}{g}$$

increases, $\gamma=$ $$\gamma = (R')^{-1}\left(\frac{v^* N_{total}}{g}\right)$$

decreases. This property implies that the channel inversion in the conventional power control may not be optimal in maximizing the throughput at the same average power. Consequently, a separate rate control may be justified.

In one aspect, rate control may be determined from a Rake receive where each multiple path may be captured by a finger at the base station receiver. In such an aspect, let (be the total received power of finger i of user k at time n. Further, let $N_0$ be the thermal noise and $$I_0(n) = \Sigma_k \Sigma_i (\hat{E}_c)_{k,i,n} + N_0$$

be the total interference. Further, rise-over-thermal (RoT), is formally defined as $$RoT(n) = \frac{I_{0(n)}}{N_0}.$$

It is often used to indicate the total interference level on the uplink. To link RoT with user SINR, let $$\left(\frac{\hat{E}_{cp}}{N_t}\right)_{k,i,n}$$

be the chip-level pilot SINR of finger i of user k during time slot n. Let $(\hat{N}_t)_{k,i,n} = I_0(n) - (\hat{E}_c)_{k,i,n}$ and as seen in equation (4):

$$\left(\frac{\hat{E}_c}{N_t}\right)_{k,i,n} = \left(\frac{\hat{E}_{cp}}{N_t}\right)_{k,i,n} [1 + T2P_k(n) + \text{Gain}_{overhead,k}] \quad (4)$$

where $T2P_k(n)$ and $\text{Gain}_{overhead,k}$ are the power offset of the traffic and overhead channels, respectively, of user k. Further, $T2P_k(n)$, $\text{Gain}_{overhead,k}$ and $$\left(\frac{\hat{E}_{cp}}{N_t}\right)_{k,i,n}$$

are assumed known to the scheduler and the load from finger i of user k may be defined using equation (5):

$$\hat{L}_{k,i}(n) = \frac{(\hat{E}_c)_{k,i,n}}{I_0(n)} = \frac{\left(\frac{\hat{E}_c}{N_t}\right)_{k,i,n}}{1 + \left(\frac{\hat{E}_c}{N_t}\right)_{k,i,n}} \quad (5)$$

In another aspect, rate control may be determined from an equalizer receiver where multiple paths are captured by regularly spaced delay taps. In one aspect, the sampling rate may be higher than the signal bandwidth for best performance. Let $(\hat{E}_c)_{k,i,n}$ be the total received power of tap i of user k at time n. Let $N_0$ be the thermal noise and $$I_0(n) = \Sigma_k \Sigma_i (\hat{E}_c)_{k,i,n} + N_0$$

be the total interference. RoT, is defined as $$RoT(n) = \frac{I_0(n)}{N_0}.$$

As such, $(\hat{E}_c)_{k,i,n}$ my be defined as in equation (6):

$$(\hat{E}_c)_{k,i,n} = (\hat{E}_{cp})_{k,i,n} [1 + T2P_k(n) + \text{Gain}_{overhead,k}] \quad (6)$$

Therefore, the load from tap i of user k can be defined using equation (7):

$$\hat{L}_{k,i}(n) = \frac{(\hat{E}_c)_{k,i,n}}{I_0(n)} \quad (7)$$

In summary, uplink scheduling module 524 may try to maintain a target level of Rise-over-Thermal (RoT), defined as the ratio between total interference plus thermal noise, and the thermal noise itself. Maintaining RoT is may be used to ensure minimum performance for cell edge users. RoT can be accurately measured in a WCDMA system. The received power from each of the users served by this base station 520 may be determined by the uplink scheduling module 524. For user k, with request data rate $r_{support}(k)$, its scheduling priority may be determined by the Proportional Fair principle of equation (8):

$$\text{Priority}(k) = \frac{r_{support}(k)}{\tilde{r}(k)} \quad (8)$$

Where $\tilde{r}(k)$ is the average served throughput. With time-varying channels, multi-user diversity may also be achieved since users tend to be served when their channel quality is above its average.

In one aspect, UE 510 may include power control module 512 which may be operable to enable enhanced uplink operations during high data rate communications through effectively controlling self-interference by the UE 510. In one aspect, power control module 512 may use a basic uplink power control loop function in Release 99, where there are two loops in the power control: inner-loop and outer-loop. The inner-loop power control maintains the received SINR to the target level, which may be set by outer-loop power control such that a certain packet error rate (PER) is achieved at the HARQ termination target. To maintain a designated PER, the SINR target may be increased by a $\text{step}_{up}$ in response to a packet failure, and decreased by a $\text{Step}_{down}$ in response to a packet success, such as seen in equation (9):

$$\frac{\text{step}_{up}}{\text{step}_{down}} = \frac{1 - PER}{PER} \quad (9)$$

In HSUPA, the power control and rate control may interact in the following way: the inner loop power control adjusts the mobile transmit power through the one bit per slot feedback, such that the target pilot SINR is maintained around a threshold set by the outer-loop power control. In one aspect, the threshold may be dynamic. In such an aspect, the threshold value may be increased in response to detection of packet reception failures. In another aspect, the threshold value may be decreased in response to detection of packet reception successes. In another aspect, the overhead channel power may be at a fixed offset to that of pilot. The traffic channel power to pilot power ratio may be determined by the rate control, namely a received scheduling. Such a mechanism enables low packet error rate of the traffic channel and enable reasonable channel estimation quality at the same time.

Further, power control module 512 may include pilot power module 513 which may be operable to set a control channel transmit power from a received transmit power value.

Further, power control diversity module 512 may include data power module 514 which may be operable to apply a T2P limit has been chosen by the scheduling, where the proper packet format is chosen whose initial T2P follows a T2P-packet format mapping. Further, data power module 514 may only follow 'down' command for reducing transmit power.

In one aspect, the T2P value may include an additional margin. In such an aspect, the outer-loop power control may be replaced by a margin loop in the mapping from T2P to packet format. The margin may be added to the nominal T2P for each packet format. Additionally, when a UE uses a margin, a node B may maintain a contrast transmit power. To maintain a designated PER, this margin is increase by a $\text{margin}_{up}$ in response to a packet failure, and decrease by a $\text{margin}_{down}$ in response to a packet success as seen in equation (10):

$$\frac{\text{margin}_{up}}{\text{margin}_{down}} = \frac{1 - PER}{PER} \tag{10}$$

Such an aspect may reduce excessive power increase when the channel fades down. Fixing the set point for receive pilot SINR decouples the pilot and data channels even for the outer-loop power control. However, the margin loop modifies the nominal T2P at the start of each packet.

In one aspect, base station 520 may conduct a downlink (DL) communication to terminal 510 via transceivers and antennas 526. At the UE 510, the DL communication may be received via antennas 516 and transceivers. In one aspect, the DL communication information may include uplink scheduling assignments.

Various operations diagrams for the enhanced uplink operations are described with reference to FIGS. 7A-7D.

In one operational example, the performance of various schemes under single-cell single user scenario, which resembles the real system with bursty data traffic is discussed. A bursty data traffic environment is used since most data applications are inherently bursty and the main use case for high data rate on the uplink, which is for the partially loaded systems where the number of simultaneously active users is low. Further, in the operational simulation, a UE may be placed in a random location and the simulation may follow the evaluation methodology of both 3GPP and 3GPP2. General simulation parameters are summarized in Table I.

TABLE I

Simulation parameters

| Parameter | Value |
|---|---|
| Cell layout | Single cell, omni-antenna |
| Users per cell | 1 |
| Carrier frequency | 2.0 GHz |
| Inter-site distance | 500 m |
| Mobile PA backoff | 2 dBm |
| Path loss model | 128.2 + 37.6 * $\log_{10}$(a[km]) |
| Shadowing corr. coeff. | 0.5 inte-rsite, 1.0 intra-site |
| Shadowing lognormal std | 8.0 dB |
| Basestation noise figure | 9.0 dB |
| Mobile Max output power | 21 dBm |
| Traffic model | Best effort |
| TTI duration | 2 ms |
| Channel models | Pedestrian A, Pedestrian B, TU [6] |
| Mobility speed | 3 km/h |
| Power control noise | 0.5 dB Gaussian noise |
| RoT target | 10 dB |
| Receiver type | Rake and linear MMSE |

Furthermore, one can assume the first transmission is targeted at 10% and 1% BLER, respectively. The BLER target may be controlled by updating the set point in the power control loop in a general scheme (e.g. scheme 1) and the margin scheme (e.g. scheme 2) based on the CRC decoding result. More specifically, when E-DPDCH decoding fails, the set point is increased by step$_{up}$ (margin$_{up}$). On the other hand, if E-DPDCH is successfully decoded, the set point may be decreased by step$_{down}$ (margin$_{down}$). Generally, one can assume a step$_{up}$ (margin$_{up}$) is 0.5 dB. When the first transmission is targeted for 10% BLER, one can additionally investigate the case with step$_{up}$ (margin$_{up}$) given by 0.05 dB, which provides the same slew rate as in the case with 1% BLER target and 0.5 dB step size and may yield a similar dynamic of the set point.

Both Rake receiver and linear minimum-mean-square-error (LMMSE) chip-level equalizer receiver are discussed further below. In one aspect, the LMMSE equalizer may be ½ chip spaced, and the equalizer may have 40 taps (i.e., 20 chips) [15]. When LMMSE equalizer receiver is applied, post equalizer $$\frac{E_{cp}}{N_t}$$

may be used to drive the inner loop power control on the pilot channel. Due to the single user nature in these simulations, the RoT across different cases may be aligned with the average mobile transmit power. RoT results are not presented in tables II and III.

TABLE II

Average Throughput

| $T_{avg}$ | Rake Receiver | | | LMMSE Receiver | | |
|---|---|---|---|---|---|---|
| [Mbps] | PA3 | PB3 | TU3 | PA3 | PB3 | TU3 |
| Scheme 1 | 6.3 | 2.9 | 3.4 | 5.5 | 5.0 | 4.8 |
| Scheme 2 | 5.9 | 3.1 | 3.6 | 5.3 | 4.9 | 4.7 |
| Scheme 3 | 5.8 | 3.1 | 3.6 | 5.3 | 4.8 | 4.7 |

TABLE III

Average Transmission Power

| $P_{avg}$ | Rake Receiver | | | LMMSE Receiver | | |
|---|---|---|---|---|---|---|
| [dBm] | PA3 | PB3 | TU3 | PA3 | PB3 | TU3 |
| Scheme 1 | −4.4 | −5.3 | −5.9 | −5.5 | −7.0 | −7.2 |
| Scheme 2 | −5.3 | −6.5 | −7.0 | −6.3 | −7.8 | −7.9 |
| Scheme 3 | −5.2 | −6.5 | −7.0 | −6.4 | −7.9 | −8.0 |

With the disclosed schemes and under multi-path fading channels, the average throughput may be increased and the average transmission power may contemporaneously be decreased. For convenience, the combined power gain is defined as follows in equation (11):

$$\Delta P \cong \Delta P_{avg} + 10 \cdot \log_{10}(\Delta T_{avg}) \tag{11}$$

where $\Delta P_{avg}$ and $\Delta T_{avg}$ is the difference (in dB) of average UE transmission powers, and the ratio of average UE throughputs, respectively, of the proposed scheme and the baseline scheme. Note that the definition of (11) assumes a linear relationship between throughput and power. This assumption may hold in low SNR (e.g., low data rate) scenario. In high data rate scenario, however, the throughput-power may be sublinear. For example, the capacity of a point-to-point link may be given by $$C = W \log_2 \left(1 + \frac{P}{N_0 W}\right)$$

bits/s. In practice, noisy channel estimation, quantization noise, etc. may effectively limit the maximum achievable throughput, which exhibits a highly nonlinear throughput-power relationship. In one aspect, the proposed scheme may achieve higher throughput with less power. Thus, by the nonlinear throughput-power relationship, the performance metric ΔP may be conservative and give a lower bound of a measured performance gain. From Table II and III, the combined power gains for various cases, which are s may be derived and may be summarized in Table IV. Table VI demonstrates that for a multipath channel (PB channel and TU channel), the proposed schemes have combined power gain that is larger than 1.3 dB when a Rake receiver is considered. In one aspect, a 1 dB saving of power may translate into greater than 20% extension in battery life. For PA channel, the gain may be smaller compared to multipath channel. For the LMMSE equalizer case, the observed gain may be around 0.6 dB for all cases.

TABLE IV

Average Combined Power Gain

| ΔP | Rake Receiver | | | LMMSE Receiver | | |
|---|---|---|---|---|---|---|
| [dB] | PA3 | PB3 | TU3 | PA3 | PB3 | TU3 |
| Scheme 2 | 0.6 | 1.5 | 1.3 | 0.6 | 0.6 | 0.6 |
| Scheme 3 | 0.5 | 1.5 | 1.3 | 0.6 | 0.7 | 0.6 |

Figure 10:
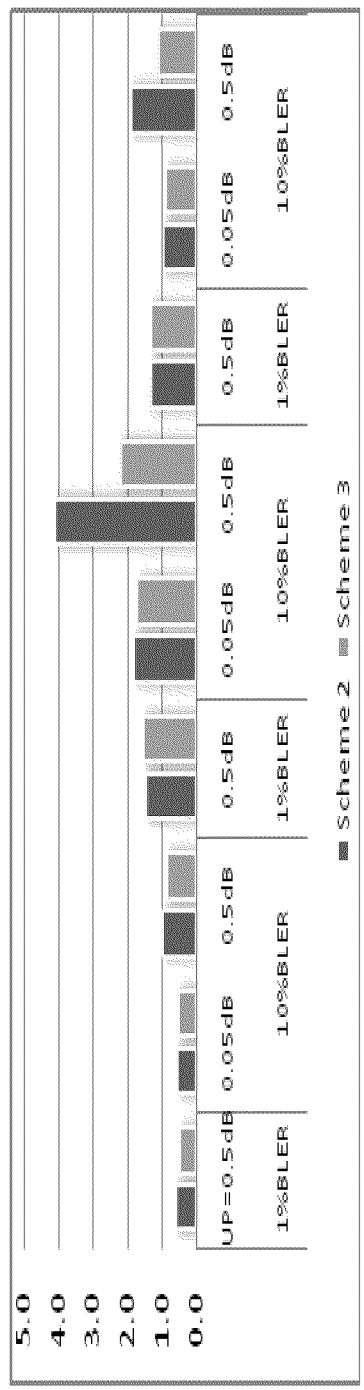
FIG. 10 is a chart depicting example simulation results according to one aspect.
Figure 11:
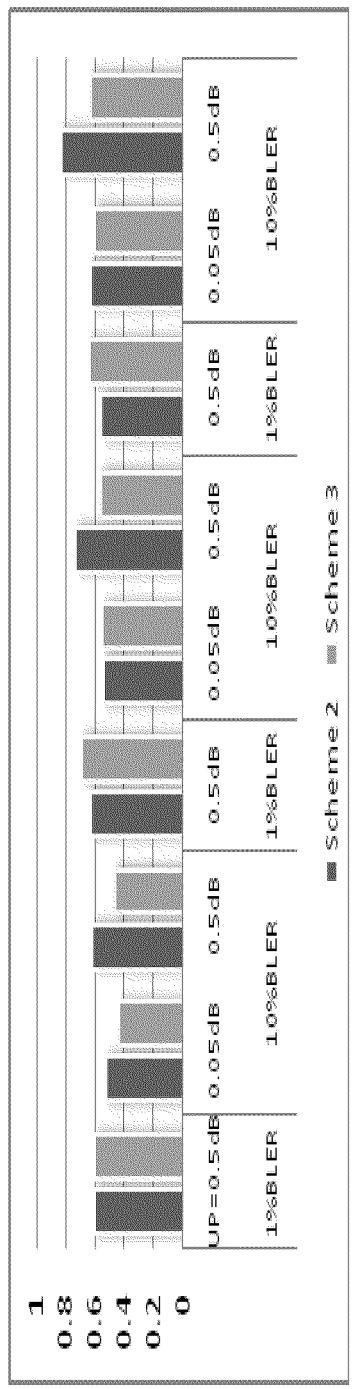
FIG. 11 is a chart depicting example simulation results according to another aspect.

For other scenarios (with different BLER target and/or different step sizes), the combined power gains of Schemes 2 (e.g. decoupled data channel) and 3 (margin addition) over Scheme 1 are summarized in FIG. 10 for a Rake receiver and in FIG. 11 for LMMSE equalizer receiver. When a Rake receiver is applied, one may observe >1.0 dB combined gain for multipath channels, and around 0.5 dB gain for PA3 channel. When equalizer is applied, the gains may be around 0.5-0.6 dB.

In summary of the operational simulation, various proposed schemes, show 0.5-0.6 dB gain over the baseline scheme for PA3 channel and larger than 1.0 dB gain for multipath channels when Rake receiver is assumed. When equalizer receiver is applied, the self-interference may be partially mitigated, and the gain may be smaller than that in a Rake receive case. Nevertheless, 0.5-0.6 dB gain may be achievable.

Figure 6:
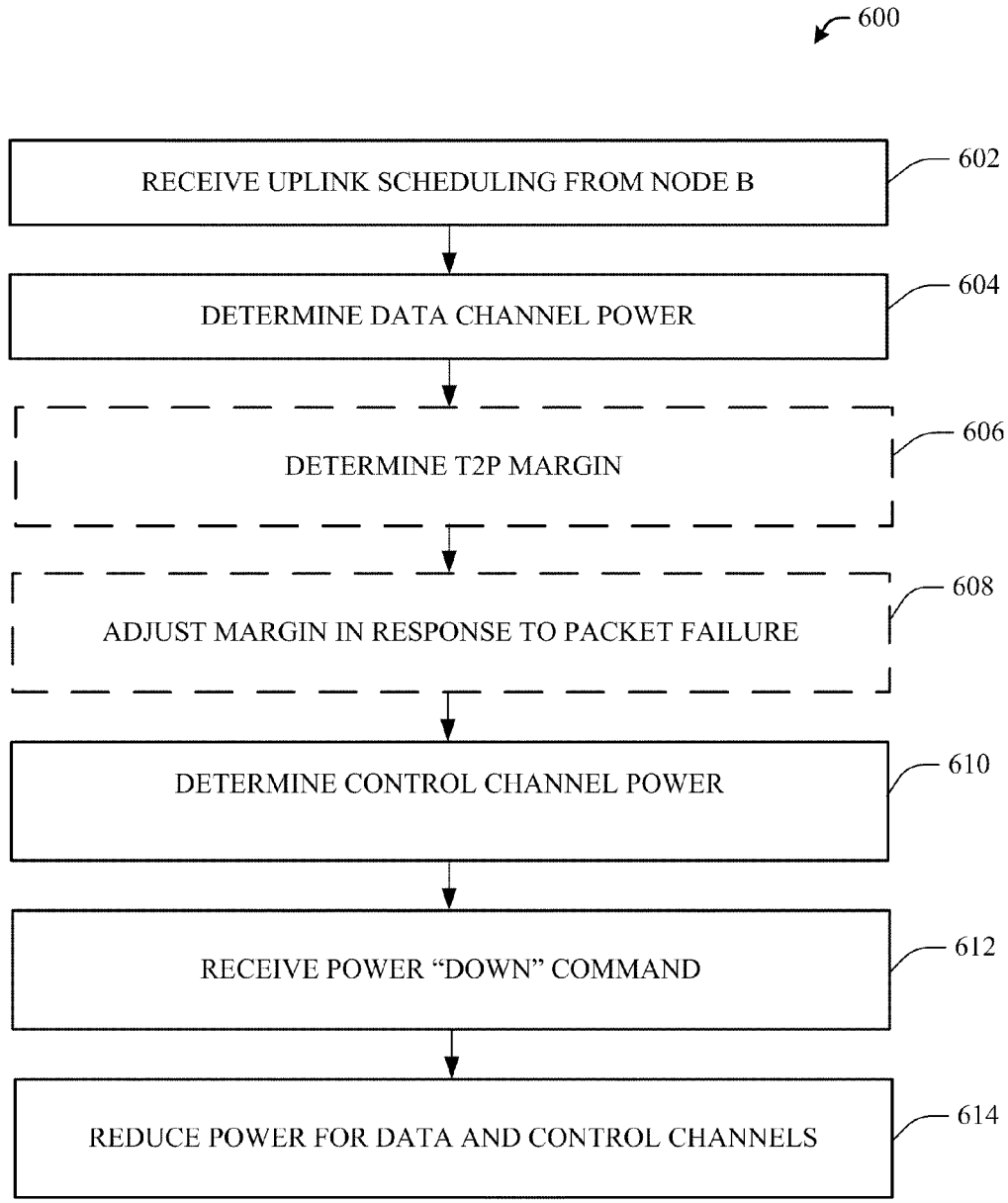
FIG. 6 is an example flow diagram of a methodology enabling uplink transmit diversity using one or more beamforming schemes according to an aspect.

FIG. 6 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, an example method 600 for enable enhanced uplink operations is illustrated. At reference numeral 602 uplink scheduling message may be received from a node B. In one aspect, the uplink scheduling message may include a rate control value and a transmit power value from a node B, wherein the rate control value is determined through uplink scheduling by the node B, and wherein the transmit power value is selected by the node B to maintain a signal to interference plus noise (SINR) metric within a threshold. In one aspect, the rate control value is determined by the node B using Rake combining. In another aspect, the rate control value is determined by the node B using a LMMSE chip-level equalizer. At reference numeral 604, a data channel power control value may be determined. In one aspect, the power control value may be determined from the rate control value received from the node B. In another aspect, the power control value may be determined from both the rate control value and the transmit power value received from the node B. In one aspect, the data channel may be transmitted using an E-DPDCH.

Additionally, in one aspect, at reference numeral 606 a margin may be determined and added to the data power value. In such an aspect, the margin value may be added to the nominal T2P for each packet format. Further, in such an aspect, at reference numeral 608, to maintain a designated PER, this margin is increase by a $margin_{up}$ in response to a packet failure, and decrease by a $margin_{down}$ in response to a packet success as seen in equation (10).

At reference numeral 610 a control channel power may be determined. In one aspect, the control channel power may be determined from a received transmit power value. Further, in one aspect, the control channel may be transmitted using an enhanced dedicated physical control channel (E-DPCCH). The UE may transmit both data and control channels to the node B, and thereafter, at reference numeral 612, the UE may receive a power "down" command. At reference numeral 614, in response to the power down command both data and control channels may reduce their transmit power values by a defined amount. By contrast, if a power up command is received, only the control channel power value may increase.

Turning now to FIGS. 7A, 7B, 7C and 7D, examples block diagrams for enabling enhanced uplink operations are illustrated in a communications system 700, such as a CDMA system, HSUPA system, etc. Generally, communications may be arranged into TTI 702, with each TTI including multiple time slots 704. As depicted in FIGS. 7A, 7B, 7C and 7D each TTI 702 may include three time slots 704. Further, during the duration of a TTI a UE, such as UE 800, may obtain information that may prompt to the UE to modify parameters associated with transmission power. By way of example, and not limitation, a pilot channel power level 706 and a data channel power level 708 are depicted for each slot 704 during a TTI 702. In one aspect, the pilot channel power level 706 may be determined from a received transmit power value. Further, in one aspect, the pilot channel may include an E-DPCCH. In another aspect, the data channel power level may be derived from an uplink scheduling command. Further, in one aspect, the data channel may include an E-DPDCH. Various operations diagrams for the enhanced uplink operations are described with reference to FIGS. 7A-7D where the UE receives power up and/or power down commands.

FIGS. 7A, 7B, 7C and 7D, depict one or more enhanced power control schemes which may be used to improve uplink operations through reducing self-interference during high data rate communications.

Figure 7A:
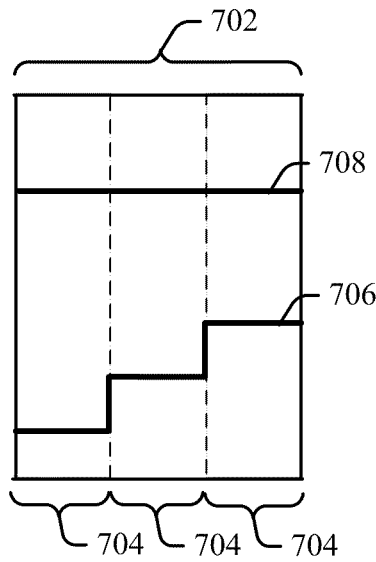
FIG. 7A is an example block diagram for enhanced uplink operations according to an aspect.

With reference to FIG. 7A, during the depicted TTI 702, the UE may have received a power up command at each slot 704. As such, the pilot channel power level is increased, while the data channel power level remains constant.

Figure 7B:
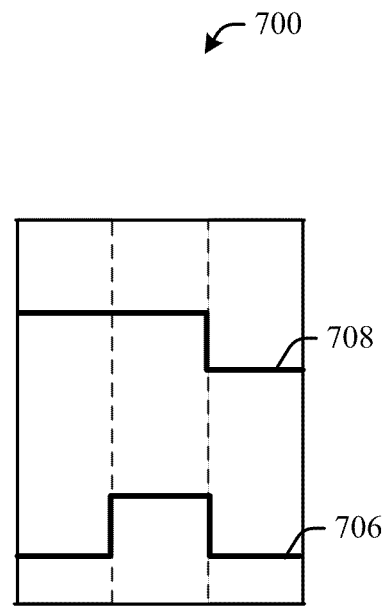
FIG. 7B is an example block diagram for enhanced uplink operations according to an aspect.

With reference to FIG. 7B, during the depicted TTI 702, the UE may have received a power up command after the first slot 704 and a power down command after the second slot 704. As such, the pilot channel power level is increased after the first slot and decreased after the second slot, while the data channel power level remains constant after the first slot and is decreased after the second slot.

Figure 7C:
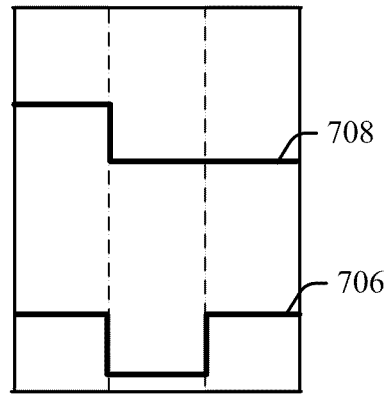
FIG. 7C is an example block diagram for enhanced uplink operations according to an aspect.

With reference to FIG. 7C, during the depicted TTI 702, the UE may have received a power down command after the first slot 704 and a power up command after the second slot 704. As such, the pilot channel power level is decreased after the first slot and increased after the second slot, while the data channel power level is decreased after the first slot and remains constant after the second slot.

Figure 7D:
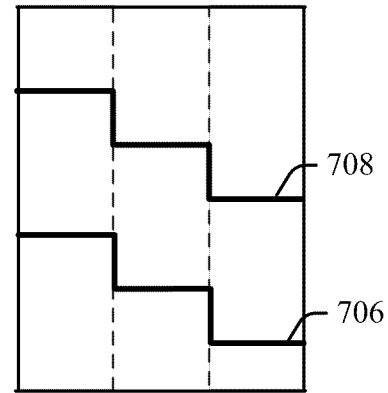
FIG. 7D is an example block diagram for enhanced uplink operations according to an aspect.

With reference to FIG. 7D, during the depicted TTI 702, the UE may have received a power down command after the first slot 704 and another power down command after the second slot 704. As such, the pilot channel power level is decreased after the first slot and decreased again after the second slot, and the data channel power level is also decreased after the first slot and decreased again after the second slot.

Figure 8:
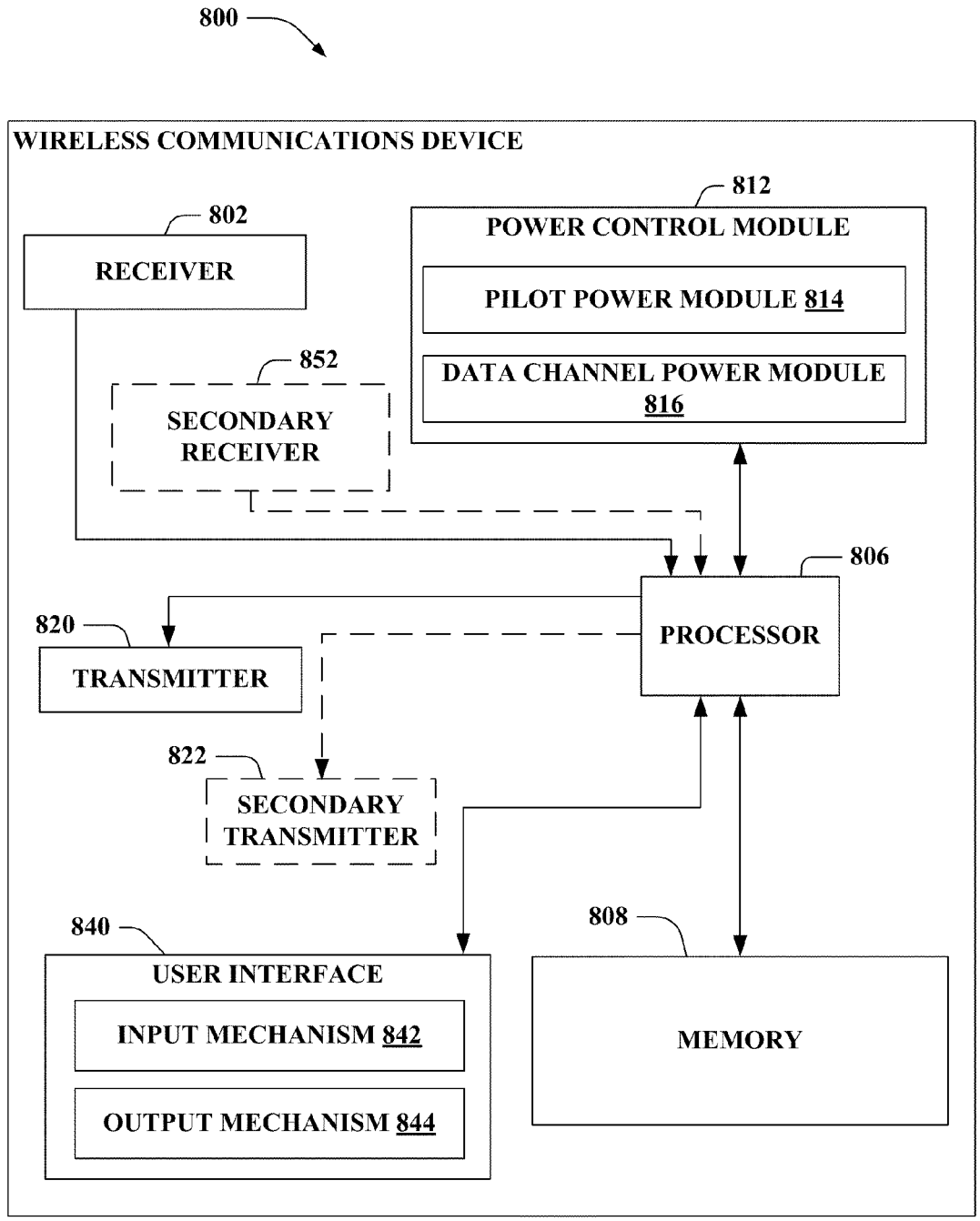
FIG. 8 is a block diagram of an example wireless communications device that can enable enhanced uplink operations according to an aspect.

With reference now to FIG. 8, an illustration of a user equipment (UE) 800 (e.g. wireless communications device (WCD), client device, etc.) that enhanced uplink operations is presented. UE 800 comprises receiver 802 that receives one or more signal from, for instance, one or more receive antennas (not shown), performs typical actions on (e.g., filters, amplifies, downconverts, etc.) the received signal, and digitizes the conditioned signal to obtain samples. Receiver 802 can comprise an oscillator that can provide a carrier frequency for demodulation of the received signal and a demodulator that can demodulate received symbols and provide them to processor 806 for channel estimation. In one aspect, UE 800 may further comprise secondary receiver 852 and may receive additional channels of information.

Processor 806 can be a processor dedicated to analyzing information received by receiver 802 and/or generating information for transmission by one or more transmitters 820 (for ease of illustration, only transmitter 820 and an optional secondary transmitter 822 are shown), a processor that controls one or more components of UE 800, and/or a processor that both analyzes information received by receiver 802 and/or secondary receiver 852, generates information for transmission by transmitter 820 for transmission on one or more transmitting antennas (not shown), and controls one or more components of UE 800. In one aspect, UE 800 may further comprise secondary transmitter 822 and may transmit additional channels of information.

User equipment 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods is intended to comprise, without being limited to, these and any other suitable types of memory.

User equipment 800 can further comprise power control module 812 to enable enhanced uplink operations. Power control module 812 may further include pilot power module 814 to determine a pilot channel power level for use during uplink communications. Additionally, power control module 812 may further include data channel power module 816 to determine one or more data channel power levels for use during uplink communications. Further, processor 806 can provide means for enabling power control module to receive a rate control value and a transmit power value from a node B, wherein the rate control value is determined through uplink scheduling by the node B, and wherein the transmit power value is selected by the node B to maintain a signal to interference plus noise (SINR) metric within a threshold, transmit control channel information at a first power level determined from the transmit power value, and transmit data channel information at a second power level determined from both the rate control value and the transmit power value.

Additionally, mobile device 800 may include user interface 840. User interface 840 may include input mechanisms 842 for generating inputs into wireless device 800, and output mechanism 842 for generating information for consumption by the user of wireless device 800. For example, input mechanism 842 may include a mechanism such as a key or keyboard, a mouse, a touch-screen display, a microphone, etc. Further, for example, output mechanism 844 may include a display, an audio speaker, a haptic feedback mechanism, a Personal Area Network (PAN) transceiver etc. In the illustrated aspects, output mechanism 844 may include a display operable to present media content that is in image or video format or an audio speaker to present media content that is in an audio format.

Figure 9:
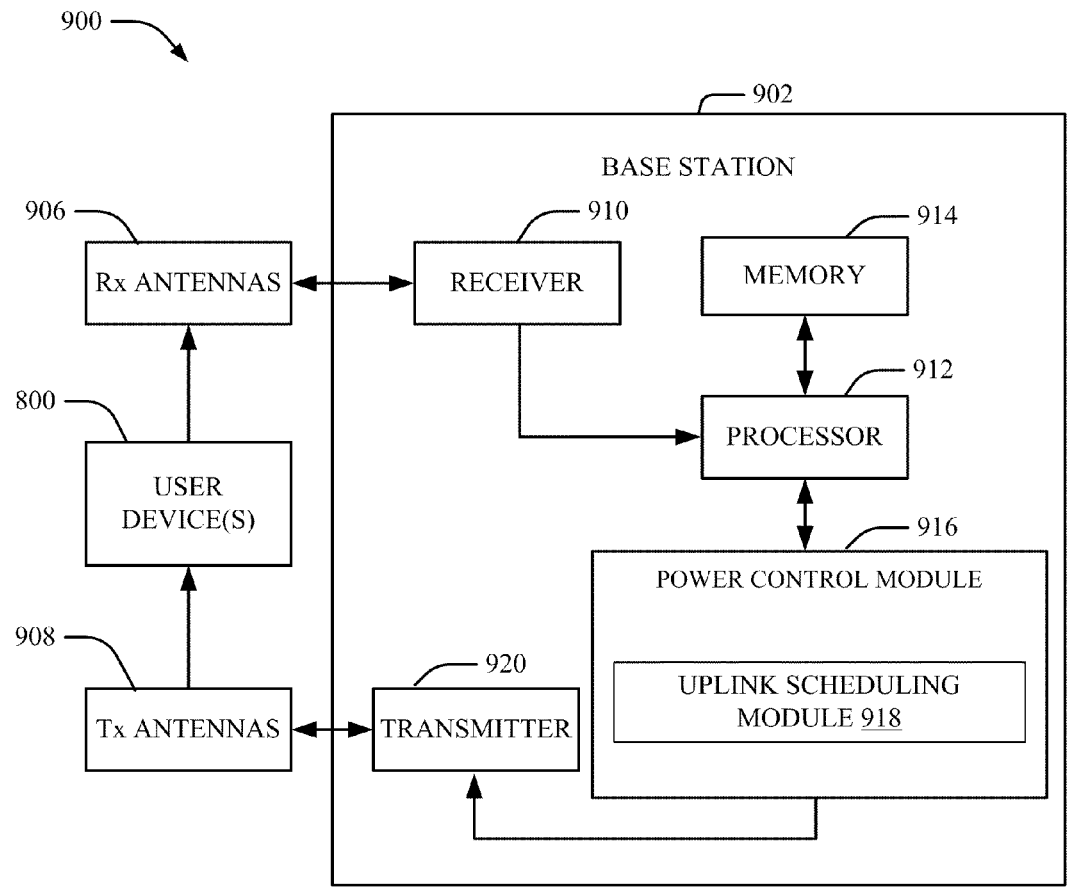
FIG. 9 is a block diagram depicting the architecture of a base station configured to enable enhanced uplink operations according to another aspect herein described.

With reference to FIG. 9, an example system 900 that comprises a Node B 902 with a receiver 910 that receives signal(s) from one or more user devices 800, through a plurality of receive antennas 906, and a transmitter 920 that transmits to the one or more user devices 800 through a plurality of transmit antennas 908. Receiver 910 can receive information from receive antennas 906. Symbols may be analyzed by a processor 912 that is similar to the processor described above, and which is coupled to a memory 914 that stores information related to wireless data processing. Processor 912 is further coupled to a power control module 916 that enables enhanced uplink operations from user devices 800.

In one aspect, power control module 916 may include uplink scheduling module 918. In one aspect, uplink scheduling module 918 may be operable for determining a scheduling grant for the UE 800. Signals may be multiplexed and/or prepared for transmission by a transmitter 920 through one or more transmit antennas 908 to user devices 800.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of enhanced uplink operations, comprising:
receiving a power control command from a node B, wherein the power control command is selected by the node B to maintain a signal to interference plus noise (SINR) metric within a dynamic threshold for a pilot channel;
transmitting pilot channel information at a pilot channel power adjusted from a first pilot channel power level to a second pilot channel power level that is determined according to the power control command, wherein the second pilot channel power level is higher or lower than the first pilot channel power level; and
transmitting data channel information at a data channel power adjusted from a first data channel power level to a second data channel power level that is determined according to the power control command, wherein the second data channel power level is the same or lower than the first data channel power level, and the pilot channel power and data channel power are decoupled.

2. The method of claim 1, wherein the second pilot channel power level is determined on a per slot basis and the second data channel power level is determined on a per transmission time interval basis.

3. The method of claim 2, wherein the per slot basis occurs more frequently than the per transmission time interval basis.

4. The method of claim 1, wherein the second pilot channel power level is determined 1500 times per second and the second data channel power level is determined 500 times per second.

5. A non-transitory computer-readable medium comprising:
code for causing a computer to receive a power control command from a node B, wherein the power control command is selected by the node B to maintain a signal to interference plus noise (SINR) metric within a dynamic threshold for a pilot channel;
code for causing the computer to transmit pilot channel information at a pilot channel power adjusted from a first pilot channel power level to a second pilot channel power level that is determined according to the power control command, wherein the second pilot channel power level is higher or lower than the first pilot channel power level; and
code for causing the computer to transmit data channel information at a power adjusted from a first data channel power level to a second data channel power level that is determined according to the power control command, wherein the second data channel power level is the same or lower than the first data channel power level, and wherein the pilot channel power and the data channel power are decoupled.

6. The non-transitory computer-readable medium of claim 5, wherein the second pilot channel power level is determined on a per slot basis and the second data channel power level is determined on a per transmission time interval basis.

7. The non-transitory computer-readable medium of claim 6, wherein the per slot basis occurs more frequently than the per transmission time interval basis.

8. The non-transitory computer-readable medium of claim 5, wherein the second pilot channel power level is determined 1500 times per second and the second data channel power level is determined 500 times per second.

9. An apparatus for enhanced uplink operations, comprising:
 means for receiving a power control command from a node B, wherein the power control command is selected by the node B to maintain a signal to interference plus noise (SINR) metric within a dynamic threshold for a pilot channel;
 means for transmitting pilot channel information at a pilot channel power adjusted from a first pilot channel power level to a second pilot channel power level that is determined according to the power control command, wherein the second pilot channel power level is higher or lower than the first pilot channel power level; and
 means for transmitting data channel information at a data channel power adjusted from a first data channel power level to a second data channel power level that is determined according to the power control command, wherein the second data channel power level is the same or lower than the first data channel power level, and wherein the pilot channel power and data channel power are decoupled.

10. The apparatus of claim 9, wherein the second pilot channel power level is determined on a per slot basis and the second data channel power level is determined on a per transmission time interval basis.

11. The apparatus of claim 10, wherein the per slot basis occurs more frequently than the per transmission time interval basis.

12. The apparatus of claim 9, wherein the second pilot channel power level is determined 1500 times per second and the second data channel power level is determined 500 times per second.

13. An apparatus for enhanced uplink operations, comprising:
 a processor configured to:
  receive a power control command from a node B, wherein the power control command is selected by the node B to maintain a signal to interference plus noise (SINR) metric within a dynamic threshold for a pilot channel;
  transmit pilot channel information at a pilot channel power adjusted from a first pilot channel power level to a second pilot channel power level that is determined according to the power control command, wherein the second pilot channel power level is higher or lower than the first pilot channel power level; and
  transmit data channel information at a data channel power adjusted from a first data channel power level to a second data channel power level that is determined according to the power control command, wherein the second data channel power level is the same or lower than the first data channel power level, and wherein the pilot channel power and data channel power are decoupled; and
 a memory coupled to the processor for storing data.

14. The apparatus of claim 13, wherein the second pilot channel power level is determined on a per slot basis and the second data channel power level is determined on a per transmission time interval basis.

15. The apparatus of claim 14, wherein the per slot basis occurs more frequently than the per transmission time interval basis.

16. The apparatus of claim 13, wherein the second pilot channel power level is determined 1500 times per second and the second data channel power level is determined 500 times per second.

17. An apparatus for enhanced uplink operations, comprising:
 a receiver operable for receiving a power control command from anode B, wherein the power control command is selected by the node B to maintain a signal to interference plus noise (SINR) metric within a dynamic threshold for a pilot channel; and
 a transmitter operable for:
  transmitting pilot channel information at a pilot channel power adjusted from a first pilot channel power level to a second pilot channel power level that is determined according to the power control command, wherein the second pilot channel power level is higher or lower than the first pilot channel power level; and
  transmitting data channel information at a data channel power adjusted from a first data channel power level to a second data channel power level that is determined according to the power control command, wherein the second data channel power level is the same or lower than the first data channel power level, and wherein the pilot channel power and data channel power are decoupled.

18. The apparatus of claim 13, wherein the second pilot channel power level is determined on a per slot basis and the second data channel power level is determined on a per transmission time interval basis.

19. The apparatus of claim 14, wherein the per slot basis occurs more frequently than the per transmission time interval basis.

20. The apparatus of claim 13, wherein the second pilot channel power level is determined 1500 times per second and the second data channel power level is determined 500 times per second.

21. The method of claim 1, wherein the second pilot channel power level is higher than the first pilot channel power level and the second data channel power level is the same as the first data channel power level.

22. The method of claim 1, wherein the second pilot channel power level is lower than the first pilot channel power level and the second data channel power level is lower than the first data channel power level.

* * * * *